(12) United States Patent
Desai et al.

(10) Patent No.: US 7,277,697 B2
(45) Date of Patent: Oct. 2, 2007

(54) METHOD AND SYSTEM FOR ESTABLISHING A TELECONFERENCE OVER A TELEPHONY NETWORK

(76) Inventors: Adesh Desai, 12021 Doral Ave., Northridge, CA (US) 91326; Sanjeev Kuwadekar, 18223 Charlton La., Northridge, CA (US) 91326; Dan Sodhi, 12041 Doral Ave., Northridge, CA (US) 91326

( * ) Notice: Subject to any disclaimer, the term of this patent is extended or adjusted under 35 U.S.C. 154(b) by 50 days.

(21) Appl. No.: 10/852,848

(22) Filed: May 24, 2004

(65) Prior Publication Data

US 2005/0014490 A1   Jan. 20, 2005

Related U.S. Application Data

(60) Provisional application No. 60/520,471, filed on Nov. 13, 2003, provisional application No. 60/510,214, filed on Oct. 9, 2003, provisional application No. 60/472,994, filed on May 23, 2003, provisional application No. 60/472,990, filed on May 23, 2003, provisional application No. 60/472,989, filed on May 23, 2003.

(51) Int. Cl.
*H04M 3/42* (2006.01)

(52) U.S. Cl. ............... 455/416; 455/415; 379/202.1; 704/246; 704/251; 370/257; 370/260; 370/261; 715/751; 709/204

(58) Field of Classification Search ............. 455/416, 455/415; 379/205.01, 202.01, 202.1; 709/204; 370/260–261, 257; 704/246, 251; 715/751
See application file for complete search history.

(56) References Cited

U.S. PATENT DOCUMENTS

| | | | | |
|---|---|---|---|---|
| 5,369,694 A | * | 11/1994 | Bales et al. | 379/206.01 |
| 5,373,549 A | * | 12/1994 | Bales et al. | 379/93.21 |
| 5,631,904 A | * | 5/1997 | Fitser et al. | 370/261 |
| 5,647,002 A | | 7/1997 | Brunson | |
| 6,069,943 A | | 5/2000 | David et al. | |
| 6,085,231 A | | 7/2000 | Agraharam et al. | |
| 6,104,789 A | | 8/2000 | Lund | |

(Continued)

FOREIGN PATENT DOCUMENTS

EP   1164774   12/2001

(Continued)

OTHER PUBLICATIONS

Partial International Search Report of Counterpart PCT Application No. PCT/US2004/016448.

(Continued)

*Primary Examiner*—William Trost
*Assistant Examiner*—Ariel Balaoing
(74) *Attorney, Agent, or Firm*—Ash Tankha of Counsel, Lipton, Weinberger & Husick

(57) ABSTRACT

A teleconference system and method in which an initiator of a teleconference sends a request or instructions to the teleconference server. The teleconference server communicates with the intended participants using basic communication tools that are generally compatible regardless of the network that the participant is subscribed to. The teleconference server stores the information, creates and sends a teleconference notification message to the intended participant that she has been invited to a teleconference. The notification message includes a unique access address associated with the teleconference, at which the participant can access to join the teleconference at the prescribed time. Different unique access addresses are associated with different teleconferences.

25 Claims, 8 Drawing Sheets

U.S. PATENT DOCUMENTS

| | | | |
|---|---|---|---|
| 6,138,036 | A | 10/2000 | O'Cinneide |
| 6,173,315 | B1* | 1/2001 | Deleeuw ..................... 709/205 |
| 6,192,407 | B1 | 2/2001 | Smith et al. |
| 6,203,192 | B1 | 3/2001 | Fortman |
| 6,208,872 | B1* | 3/2001 | Schmidt ..................... 455/518 |
| 6,212,550 | B1 | 4/2001 | Segur |
| 6,222,909 | B1 | 4/2001 | Qua et al. |
| 6,246,871 | B1 | 6/2001 | Ala-Laurila |
| 6,253,091 | B1 | 6/2001 | Naddell et al. |
| 6,272,214 | B1* | 8/2001 | Jonsson ................. 379/202.01 |
| 6,275,575 | B1* | 8/2001 | Wu ....................... 379/202.01 |
| 6,377,560 | B1 | 4/2002 | Dailey |
| 6,421,324 | B1* | 7/2002 | Boyle et al. ................ 370/261 |
| 6,477,240 | B1* | 11/2002 | Lim et al. .................. 379/67.1 |
| 6,816,468 | B1* | 11/2004 | Cruickshank ............... 370/260 |
| 2002/0078150 | A1 | 6/2002 | Thompson et al. |
| 2002/0097856 | A1 | 7/2002 | Wullert, II |
| 2002/0177456 | A1 | 11/2002 | Kimoto et al. |
| 2002/0191757 | A1 | 12/2002 | Belrose |
| 2003/0022658 | A1 | 1/2003 | Chapman, Jr. et al. |
| 2003/0023672 | A1* | 1/2003 | Vaysman ..................... 709/203 |
| 2003/0068029 | A1 | 4/2003 | McFarland |
| 2003/0092433 | A1 | 5/2003 | Flannery |
| 2003/0095642 | A1 | 5/2003 | Cloutier et al. |
| 2004/0015550 | A1* | 1/2004 | Nakamura .................. 709/204 |
| 2004/0176114 | A1* | 9/2004 | Northcutt .................... 455/466 |

FOREIGN PATENT DOCUMENTS

WO   WO 03/030474   4/2003

OTHER PUBLICATIONS

International Search Report of Counterpart PCT Application No. PCT/US2004/016448.

Webpage, www.coremobility.com/solutions/vnotes.html.

Webpage, www.coremobility.com/solutions/vnotes_infrastructure.html.

Webpage, www.coremobility.com/news/11_23_13 04.html.

* cited by examiner

METHOD AND SYSTEM FOR ESTABLISHING A TELECONFERENCE OVER A TELEPHONY NETWORK

RELATED PATENT APPLICATIONS & INCORPORATION BY REFERENCE

This application is a utility application claiming the priority of the following U.S. provisional patent applications: Ser. No. 60/472,989, filed May 23, 2003; Ser. No. 60/472,990, filed May 23, 2003; Ser. No. 60/472,994, filed May 23, 2003; Ser. No. 60/510,214, filed Oct. 9, 2003; and Ser. No. 60/520,471, filed Nov. 13, 2003. These related application are incorporated herein by reference and made a part of this application as if fully set forth herein.

BACKGROUND OF INVENTION

1. Field of the Invention

The present invention relates to teleconferencing, particularly to establishing a teleconference over a telephony network.

2. Description of Related Art

Teleconferencing involves multiple users connected to the same communication channel, allowing each user to simultaneously talk to each other. A typical teleconference involves multiple participants who each speak on their own communication device such as a phone. In this situation, a teleconference is initiated by a first user establishing a first communication channel, such as a phone call, with a second user. Once the first communication channel is established between the first and second users, the first user then establishes a second communication channel with a third user. Once the second communication channel is established, the first and second communication channels are bridged, whereby all three users can talk to each other.

A teleconference can also be established using a teleconferencing service. The teleconferencing service establishes a central communication channel. Participants call a number and are directly connected to the central communication channel. The central communication channel is pre-scheduled and each participant to the teleconference is notified prior to the teleconference as to the time of the teleconference and what phone number to dial to join.

U.S. Pat. No. 6,377,560 purportedly discloses a wireless network with a group call capability. According to its abstract, the wireless network includes a mobile switching center connected to a plurality of base stations each serving a portion of the wireless network and communicating with mobile stations on a plurality of channels. Each base station allocates one of the channels for the group call. Each mobile station in the group sends an acknowledgement of the group call to the base station serving the area where the mobile station is located. Each base station that did not receive an acknowledgement frees the allocated channel for use in other calls. This patent is primarily directed to the underlying technology for overcoming the drawbacks of prior art systems with respect message traffic and system resources. It does not significantly improve user experience in connection with establishing a group call.

U.S. Patent Application Publication No. 2003/0068029 purportedly discloses a user invoked directed outdial method and apparatus. According to a representative flow diagram its disclosure, the process purportedly includes steps wherein a caller calls into a directed outdial system, the caller identifies third parties to be called, the outdial system makes multiple outbound calls to third parties, the outdial system detects which called parties answer their call, the outdial system can further obtain specific information associated with each called party by asking questions and requesting each called party to answer the questions, the outdial system can obtain specific information associated with each called party from the caller or from a database, the outdial system can treat each called party individually based on the information associated with each called party, and connects the initial caller and the called parties in a conference call. A problem with this method is that a phone call invitation to a real time teleconference can be intrusive, particularly if the targeted participant is busy, or does not want to be disturbed at the time the invitation was received.

Accordingly, it is desirable to provide an improved teleconferencing process that invites participants in non-intrusive manner, via a single point.

SUMMARY OF INVENTION

The present invention is directed to an improved method and system for establishing a teleconference or group call with a plurality of participants.

A user initiates a teleconference by communicating with a teleconference server and identifying the intended participants of the teleconference, e.g., including the addresses of the participant communication devices. Addresses may include a phone number, fax number, or email address. Communication devices may include a cellular phone, landline phone, PDA or a computer. The teleconference server sends a teleconference notification message to each participant, which may be in the form of a voice message, text message and/or an email, depending on the targeted participant device. The notification message may include a unique access address to which the participants may call to join the teleconference immediately, or at a prescribed deferred time.

The initiating party is a subscriber of the teleconference server, thus the initiating device is compatible with the teleconference server. In accordance with the present invention, the teleconference server communicates with the intended participants using basic communication tools that are generally compatible regardless of the network that the recipient is subscribed to.

In one aspect of the present invention, a teleconference/group call initiator using an initiator device such as a cellular phone, personal digital assistant (PDA), portable computer, personal computer or landline phone instructs the teleconference server to initiate the teleconference call. The instruction may include the identification and contact information concerning the group call participants. The teleconference server stores the information, creates and sends a notification message to the intended participant that she is invited to a teleconference. The notification message may be in the form of a SMS text message, voice call, or other means of notification that are network independent, or compatible over disparate networks.

The notification message includes a unique access address associated with the group call. Different unique access addresses are associated with different group calls. In one embodiment, the unique access address may contain a phone number the participant can call to join the group call. The teleconference server authenticates the caller to be the intended participant based on the called number and/or the Caller ID of the caller, and permits the caller to join the group call that had been associated with the unique access address. In another embodiment, the notification message may contain a link to a specific location such as a website where a conference call may be conducted based on Voice over IP (VoIP). A participant may use devices (e.g., a phone) to join into the conference call, which may be different from the device (e.g., a pager) that received the notification message, particularly where the notification-receiving device may not be compatible with telephony.

The present invention is particularly suitable for use in cellular communication systems.

In one embodiment, the notification message may be in the form of a prompt, which asks a participant if he would like to join the teleconference. If the participant affirms he wishes to join the teleconference, he is automatically connected to the teleconference. An affirmation can include saying "yes" into his phone, or pressing a specified button on his phone that corresponds to the prompt.

In another embodiment, the teleconference server implements presence management to determine if a participant is present at a particular participant device at the time of initiating the teleconference. If a participant is not present, a teleconference notification message will not be sent to that particular participant device. This embodiment is also useful when establishing a teleconference that is to be conducted the time of initiation.

DESCRIPTION OF THE ILLUSTRATED EMBODIMENTS

Figure 1:
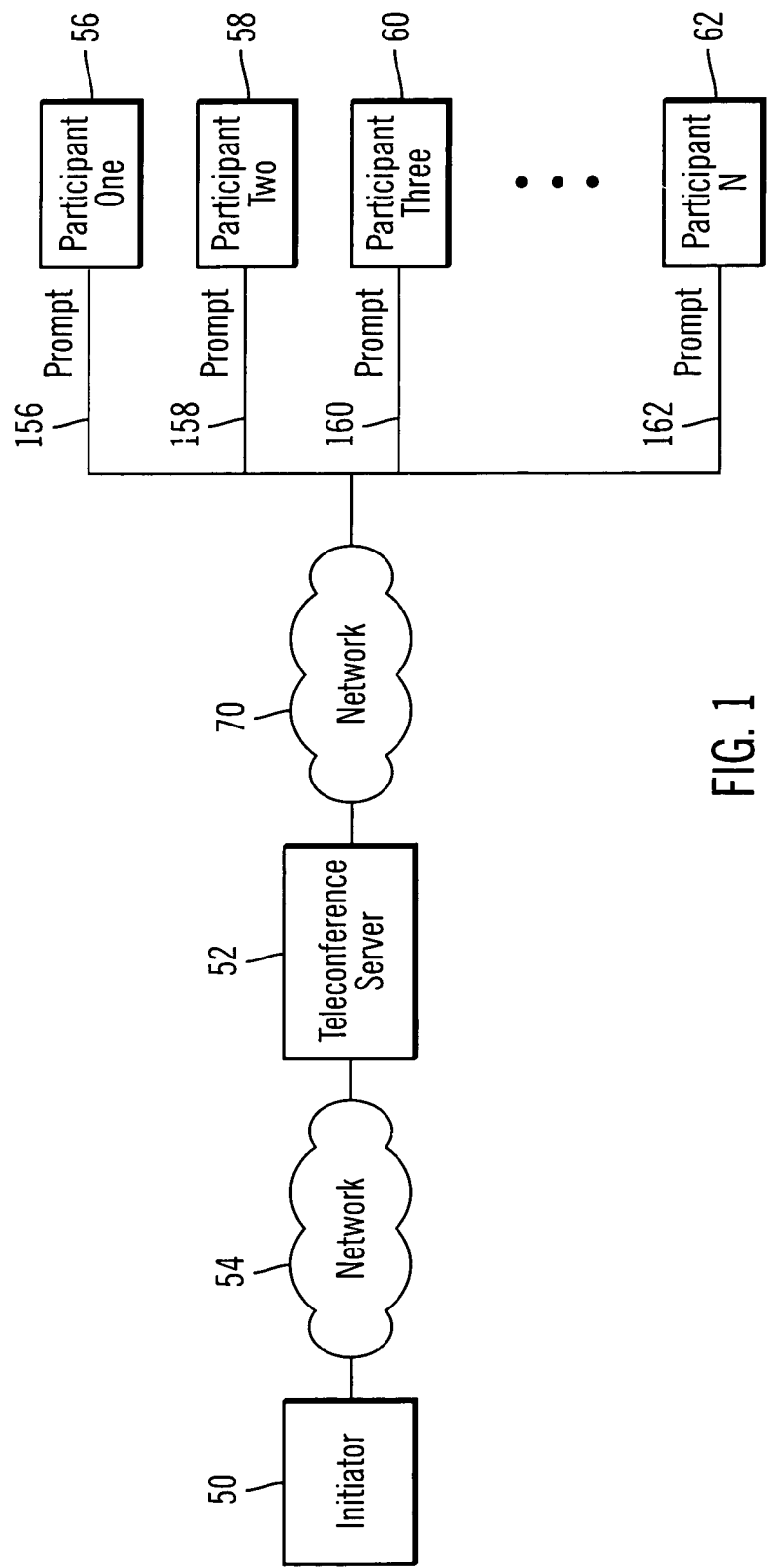
FIG. 1 is a schematic representation of a teleconference network through which an initiator and participants communicate according to one embodiment of the present invention.

The present description is of the best presently contemplated modes of carrying out the invention. This description is made for the purpose of illustrating the general principles of the invention and should not be taken in a limiting sense. The scope of the invention is best determined by reference to the appended claims.

The present invention is directed to a method and system for establishing a teleconference. To facilitate an understanding of the principles and features of the present invention, they are explained herein below with reference to its deployments and implementations in illustrative embodiments. By way of example and not limitation, the present invention is described herein-below in reference to examples of communication over a single or multiple networks and, more particularly, a method and system is disclosed for initiating a conference call via a cellular network.

The present invention can find utility in a variety of implementations without departing from the scope and spirit of the invention, as will be apparent from an understanding of the principles that underlie the invention. In particular, the present invention provides a system and process that works seamlessly across different incompatible telephony networks. Some of the telephone services are carrier, provider, network or platform dependent (collectively referred hereinafter as network dependent, as opposed to network independent), and some are user device dependent. Network dependent refers to telephony services that would work in one network (e.g., carrier, provider, platform or physical network) but not another, because of differences in operating parameters, specification, limitations, and other characteristics among the different carriers, providers, platforms or physical networks. Such differences may include incompatibilities arising from underlying technologies, communication frequencies, communication platform which may be viewed as the underlying hardware and software that handles communication over a network, communication protocol which may be viewed as the way data is exchanged among user devices, or simply the physical or operational restrictions network providers and carriers imposed to distinguish their services.

It is understood that the teleconferencing concepts of the present invention may be applied to business and personal communications, and may be implemented by commercial as well as private communication networks.

Cross-reference is made to copending U.S. patent application Ser. No. 10/852,845, entitled "A Method and System for Communicating a Data File Over a Network", which is concurrently filed on May 24, 2004, and commonly assigned to the assignee of the present invention. Said application is incorporated by reference herein, as is fully set forth herein. Said application discloses a system and method for forwarding information such as data files to a recipient across disparate or incompatible communication networks, which are not constrained by incompatible user devices. The sender sends information such as a data file to an intended recipient via a messaging server. The messaging server communicates with the intended recipient using basic communication tools that are generally compatible regardless of the network that the recipient is subscribed to. The messaging server stores the information, creates and sends a notification message to the intended recipient that she has information to be retrieved. The notification message includes a unique access address associated with the message, at which the recipient can retrieve the information. Different unique access addresses are associated with different messages.

The present invention shares some basic architecture and functionality as the system and method disclosed in such copending application. For the present invention, the teleconference server essentially parallels many of the functions of the messaging server in the copending application. Generally, an initiator of a teleconference sends a request or instructions to the teleconference server (e.g., participant identification). The teleconference server communicates with the intended participants using basic communication tools that are generally compatible regardless of the network that the participants is subscribed to. The teleconference server stores the information, creates and sends a teleconference notification message to the intended participant that she has been invited to a teleconference. The notification message includes a unique access address associated with the teleconference, at which the participants can access to join the teleconference at the prescribed time. Different unique access addresses are associated with different teleconferences. Accordingly, instead of handling the transfer of data files from a sender to a recipient using a messaging server, the present invention uses a teleconference server to handle the establishment of a teleconference, using a similar notification messaging function to facilitate the intended participants'/recipients' access to participate in the teleconference. Further similarities and distinctions are disclosed below.

FIG. 1 is a diagram illustrating an embodiment of the present invention where an initiator 50 communicates with a teleconference server 52 over a network 54 to establish a teleconference with multiple participants 56, 58, 60, 62. The network 54 may include cellular network, telephony network (e.g., landline or PSTN), data network, Internet, or other types of communications networks. The initiator 50 identifies to the teleconference server 52 which participants 56, 58, 60, 62 he wishes to invite as part of the teleconference, along with the intended participant's notification address (e.g., cellular phone number, landline phone number, email address, etc.) The initiator 50 may identify a participant by using the name to retrieve the corresponding address of the participant stored in a database at the teleconference server 52. A teleconference notification message, for example, a prompt 156, 158,160,162 is transmitted to each participant 56, 58, 60, 62 by the teleconference server 52 over a network 70 whereby each participant 56, 58, 60, 62 may join the teleconference by accepting the prompt 156,158,160,162. Depending on the networks the participants are subscribed to, the participants may be sent the notification message through the same network 54 as the initiator 50, or through a different network 70 (which may comprise different types of communications networks; see also FIG. 3), respectively. The notification message contains a unique access address, which is assigned to be associated with the specific teleconference. The notification message may also include teleconference ID, initiator's identification, date and time of teleconference, expected duration of the teleconference, other participants, agenda, and other relevant information, which information may be provided by the initiator, or by the system (e.g., time and date). The participants reads the notification message and using the unique access address assigned to access to join, into the teleconference at the prescribed time. The unique access address may be an access address to contact the teleconference server 60. The unique access address may include a phone number and/or web address for VoIP telephony. The network through which the notification message is sent to a participant may be different from the network through which the participant accesses the teleconference.

In one embodiment, the communication channel between the initiator and the teleconference server is terminated after the initiator identifies the participants. Once a participant accepts a prompt, a teleconference channel is established between the participant and the teleconference server. The teleconference server then communicates with an initiator device and the initiator device is joined on the teleconference channel with the participant. In another aspect of this embodiment, the communication channel between the initiator and the teleconference server remains active after the initiator identifies the participants. This communication channel becomes the teleconference channel, and participants who join the teleconference join the teleconference channel upon acceptance of the prompt.

Figure 3:
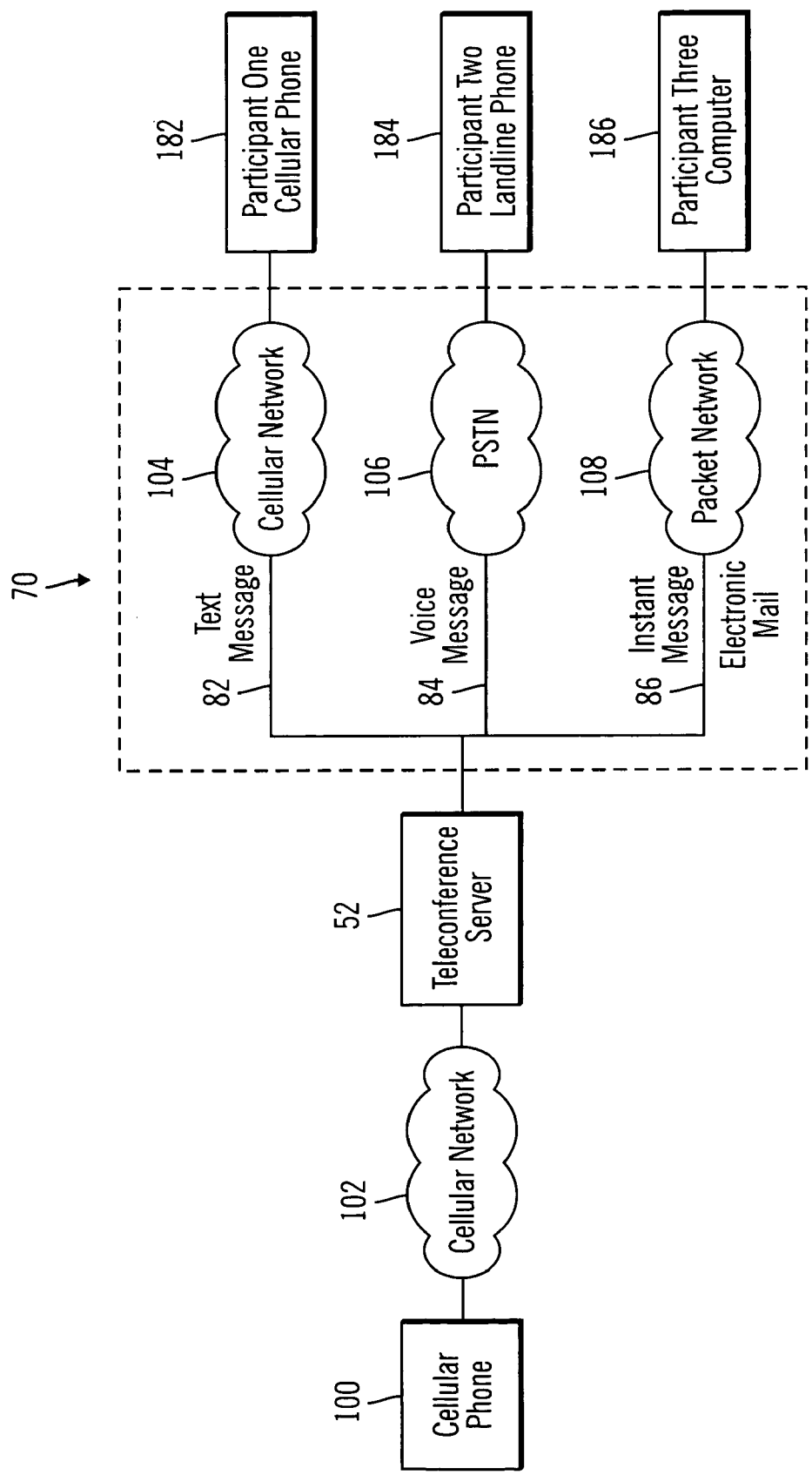
FIG. 3 is a schematic representation of one embodiment of a teleconference network through which an initiator and participants communicate where a participant device includes a cellular phone, landline phone and a computer, according to one embodiment of the present invention.

FIG. 3 is a diagram illustrating an embodiment of the present invention where initiator device is a cellular phone 100 that transmits instructions to the teleconference server 52 to notify the participant devices, including participant cellular device 182. The teleconference server 52 sends a notification text message 82 to participant cellular phone 182. The participant cellular phone 182 may be sent the notification text message 82 through the same network 102 as the initiator cellular phone, or through a different network 104 depending on the participant's network. In one embodiment, the participant network may be different than the network of the initiator, with respect to, for example, communication protocol, operating frequency, operating platform or other operational and/or functional aspects that render the initiator and participant networks incompatible for direct messaging of the initiator's teleconference notification.

The notification text message 82 contains a unique access phone number that is assigned to be associated with the teleconference. The participant cellular phone 182 receives the notification text message 82 and calls the unique access phone number to participate in the scheduled teleconference. In one embodiment, the access phone number may not be visible to the participant, but rather, is associated with a menu prompt. The access phone number is dialed if the participant responds by pressing a specified button on the menu prompt on the participant cellular phone, as further explained below.

Figure 2:
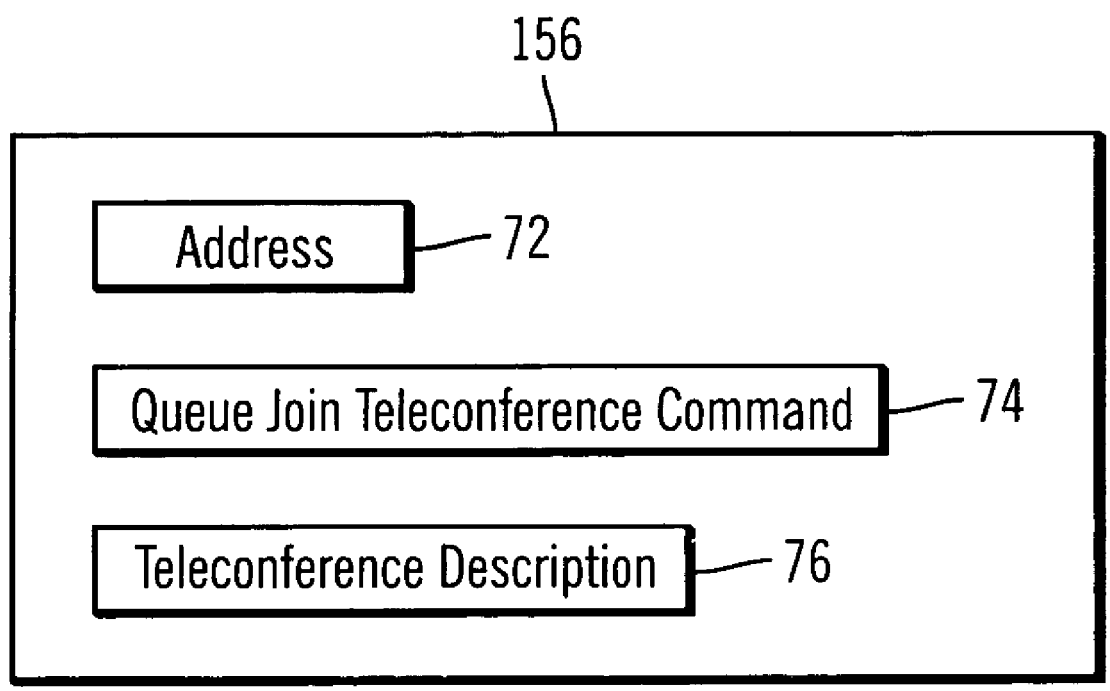
FIG. 2 is a schematic representation of a prompt according to one embodiment of the present invention.

Referring to FIG. 2, in one embodiment, a prompt 156 contains an address 72 to a communication channel used by the teleconference. The prompt also contains an executable command 74 that queues a participant's device to communicatively connect with the teleconference channel. The prompt 156 may also contain a message 76 that contains a teleconference description including information such as the identity of the teleconference participants and the topic of the teleconference. The prompt 156 may be communicated in different formats including a text message, an audible message, instant message and electronic mail. An example of an instant message system is America Online Instant Messenger. The participants may use a plurality of devices to engage in the teleconference. Devices may include a cellular phone, a personal digital assistant (PDA), a landline phone and a personal computer. Each participant device may receive a prompt in a different format, depending on the capability of the device.

In addition or in the alternate, participants may communicate commands to the teleconference server using, but not limited to, voice commands, dual tone multi frequency (DTMF) inputs via a phone handset, such as a cellular phone or landline phone, or via a web based interface, using input devices such as a keyboard and mouse.

Figure 4:
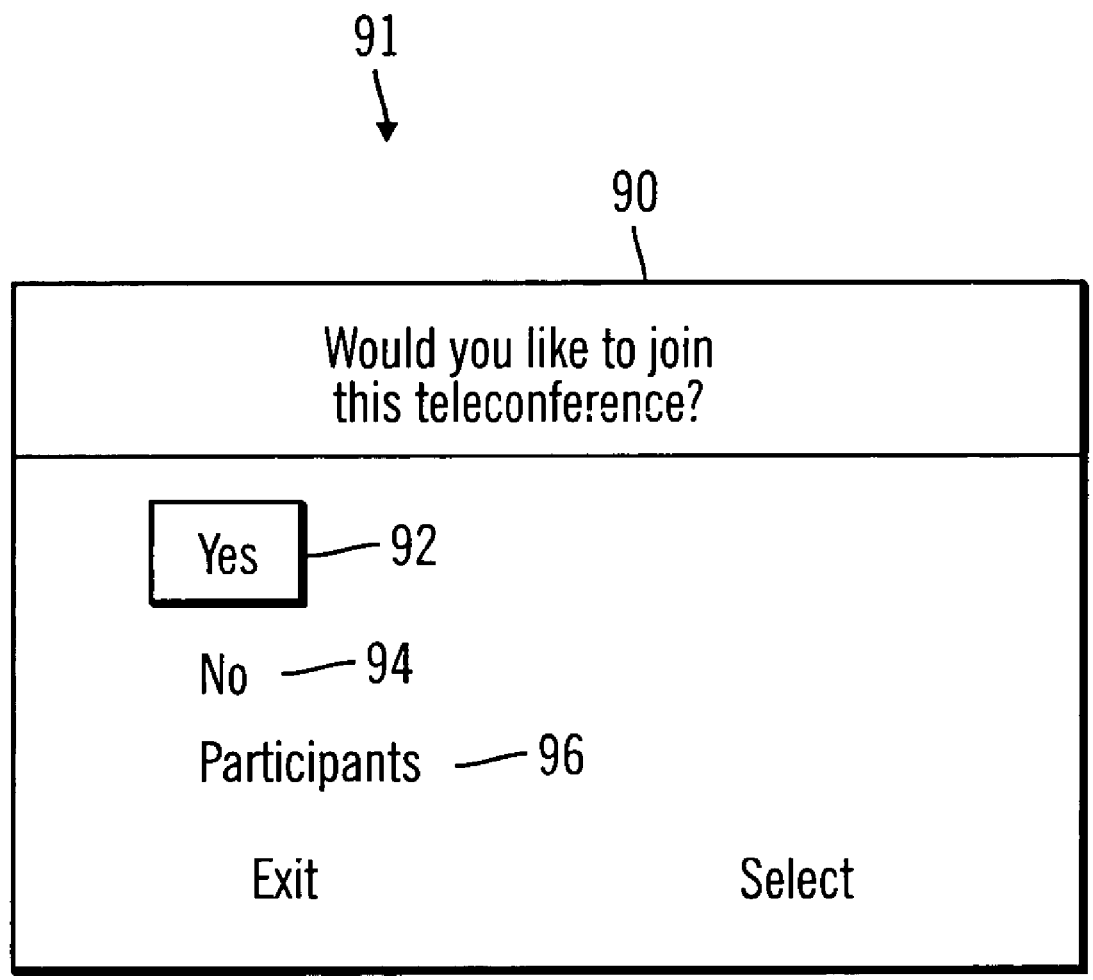
FIG. 4 is a schematic representation of a participant interface according to one embodiment of the present invention.

Referring again to FIG. 3, in one embodiment, a prompt is sent to communication devices of each invited participants to the teleconference. In one aspect of this embodiment, the prompt is a text message 82 transmitted to a cellular phone 182 over a cellular network 104. The text message contains an executable queue, that if accepted, instructs the cellular phone to dial the address of the teleconference, whereby the cellular phone joins the communication channel of the teleconference. In this embodiment, the initiator device is a cellular phone 100 that communicates with the teleconference server 52 over a cellular network 102. FIG. 4 illustrates a display screen 91 on cellular phone 182 that has a message 90 that asks the participant if she would like to join a teleconference. The participant can select yes 92 to join the teleconference, or no 94, to abstain from the teleconference.

The menu also allows a participant to view a list of the invited participants 96. The exact format of this display will vary depending on the device capabilities.

Still referring to FIG. 3, in another aspect of this embodiment, the prompt sent to a participant is a voice message 84. A voice message 84 is typically used where the participant cannot receive a text message, for example, a landline phone 184, but may also be an alternate means of notification even if the participant can receive a text message. The teleconference server 52 dials a participant's landline phone 184 through a public-switched telephone network (PSTN) 106, establishes a voice communication channel with the landline phone 184, and transmits an audible voice notification message 84 that the participant has been invited to join a teleconference. A voice menu is offered to the participant, whereby she can use voice commands (discussed infra) or DTMF responses to interact with the menu. To join the teleconference, the participant responds affirmatively to a voice prompt which asks whether the participant wishes to join the teleconference. When the participant affirms she wishes to join the teleconference, her affirmation activates a queue stored on the teleconference server to bridge the voice communication channel between the landline phone and the teleconference server, with the teleconference communication channel.

In yet another embodiment, the prompt is an electronic mail or instant message 86 that is sent over a data network 108 such as the Internet to a participant's computer 186. The electronic mail or instant message 86 contains an executable command that the participant can use to join the teleconference. The executable command contains an address that may be a web address through which the participant can join teleconference using a VoIP connection. Alternatively, the address may be a phone number that the participant can call to connect through a PSTN or cellular network.

In one embodiment, the teleconference server 52 identifies the unique access address used by the participant device through a dialed number identification service (DNIS). The DNIS may be provided by the telephony network used by the participant to join in the teleconference. The network may provide the access phone number by transmitting DTMF tones to the teleconference server 52 from a local central office. The teleconference server 52 connects the caller to the conference call that is associated with the unique access address.

In addition or in the alternate, the caller to the teleconference server 52 may be requested to authenticate herself as the intended participant upon access to the teleconference server 52. This is to provide additional security in case a person who is not the intended participant was to intentionally impersonate the participant by dialing the unique access number associate with the teleconference all initiated by the initiator 50, or was to accidentally dial such unique access number. The authentication process may involve the caller having to input the intended participant's notification address (e.g., the participant's cell phone number) and/or personal information such as a unique personal identification number (PIN) code. The teleconference server 52 authenticates the caller as the intended participant upon matching the unique access number to the callers authenticating information (e.g., participant's cell phone number, PIN, etc.). In another embodiment, the teleconference server 52 may be configured to authenticate the caller as the intended participant if the caller's Caller ID (or Automated Number Identification "ANI") matches the participant's notification address. In such embodiment, the participant must be calling from the same device as the notification address. In another embodiment, the participant may use a different device to participate in the conference call. For example, the notification address is the email address or the pager number of the participant, and the participant wishes to use participant's cellular device to participate in the conference call, where the pager or the user device that retrieved the email notification are not compatible with telephony.

Figure 8:
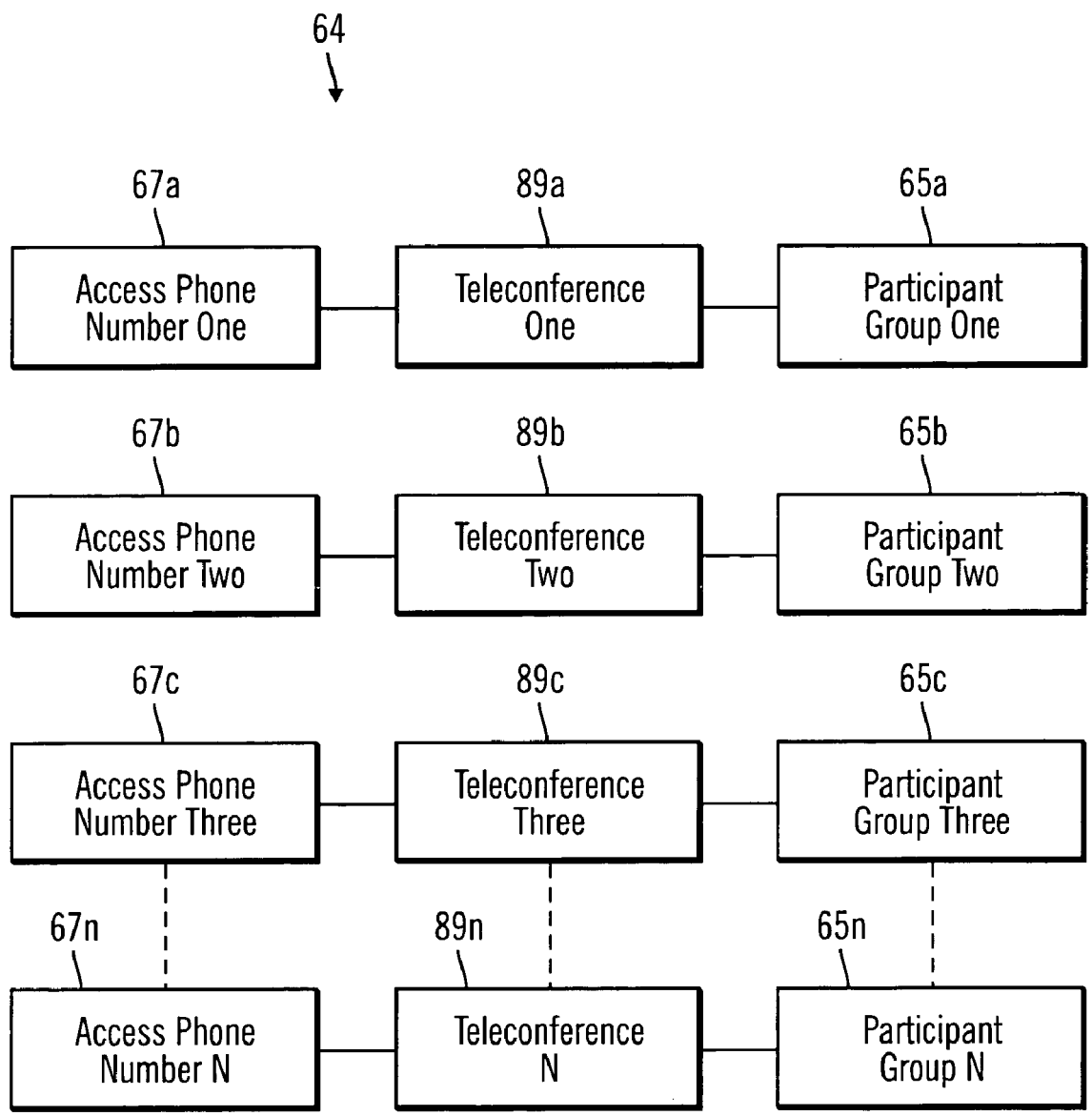
FIG. 8 is a schematic representation illustrating the configuration of different teleconferences with different teleconference groups and unique access addresses.

FIG. 8 illustrates the situation in which one or more initiators initiate different teleconferences to more than one group of intended participants. In this embodiment, the teleconference server 52 associates each of teleconferences 89*a* to 89*n* with a unique access address (e.g., access phone numbers 67*a* to 67*n*), respectively. The plurality of participant groups 65*a* to 65*n* are each associated with the respective conference groups 89*a* to 89*n* and each participant group is associated with a single unique access address (67*a*, . . . , 67*n*), respectively. The participant groups 67*a* to 67*n* are each defined by a plurality of teleconference notification addresses corresponding to the participants in the group.

When a participant in a group accesses using the corresponding assigned unique access address 67*a* to 67*n* to join the teleconference, the unique access address dialed and/or the participant's notification address are identified by the teleconference server 52 to determine the corresponding teleconference 89*a* to 89*n*, and the teleconference server 52 directs the participant to the corresponding teleconference 89*a* to 89*n*. In this embodiment, it is contemplated that the participant device receiving the notification message is the same device that is used to participate in the teleconference, so the participant's device address can be automatically determined by Caller ID or ANI. If the participant uses a different device to participate in the teleconference, the teleconference server 52 may require additional authentication procedure as describe above.

The teleconference server 52 can be configured to send the same notification message with the same unique access address associated with the same teleconference to the multiple participants as in the embodiment above, or assign a different unique access address for different participants of the same teleconference.

The notification message may comprise in addition to, or alternatively to, a text message, a voice message and/or an electronic mail. A voice notification message is typically used where the participant is to be notified through a landline phone that cannot receive a text message. The teleconference server 52 dials the participant's landline phone through a PSTN and transmits an audible voice notification message that provides an access phone number with which the recipient can dial to join the teleconference. The teleconference server may also offer the recipient to be auto-connected to the conference. The participant receiving device may comprise a cellular phone, a PDA and/or portable computer, a landline phone and a personal computer. The unique access address may comprise a phone number and/or a website address for VoIP teleconferencing. In one embodiment, the website address may appear in a text notification message and/or a voice notification message.

In another embodiment, if the teleconference initiator wishes to provide redundancy, and if an intended participant has more than one device to which notification messages may be sent, the initiator may elect to have the teleconference server 52 send a notification message to more than one participant device. After the participant joined into the teleconference associated with the notification message and/or once the teleconference has concluded, a cancellation message is sent by the teleconference server 52 to all the participant devices that earlier received teleconference notifications, to avoid the participant the inconvenience of attempting to access a teleconference that has already concluded.

Figure 5:
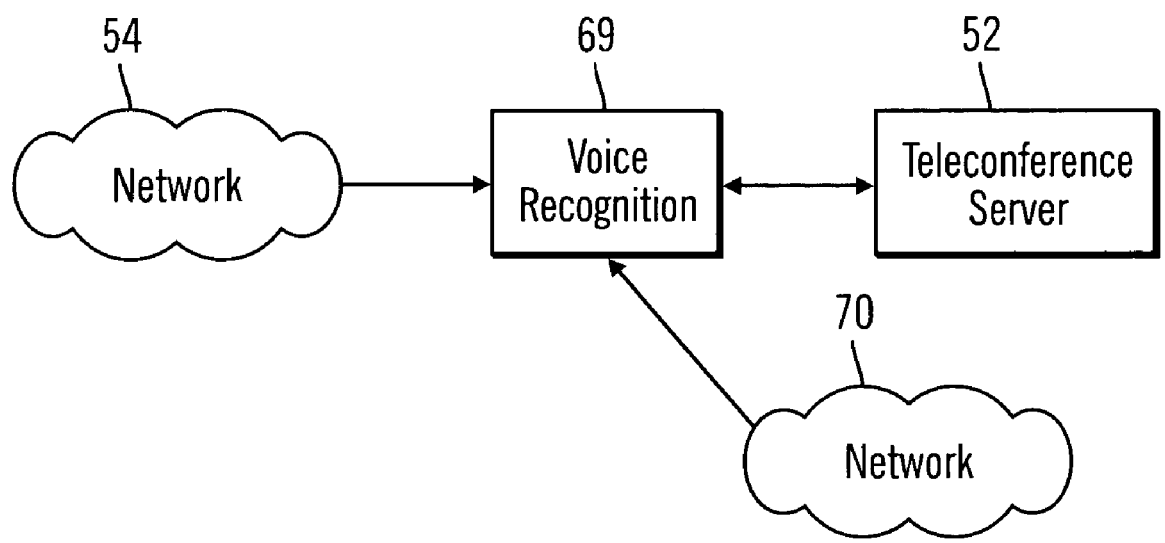
FIG. 5 is a schematic representation of a teleconference server and a voice recognition device according to one embodiment of the present invention.

Referring to FIG. 5, in an embodiment, the teleconference server 52 is configured with a voice-recognition unit 69 implementing voice-recognition processing. An example of voice-recognition processing includes a suite of Voice Manager Products produced by HeyAnita, Inc. of Burbank, CA and is herein incorporated by reference. Another example of voice-recognition programming is disclosed in U.S. Pat. No. 6,501,966 to Bareis et al. and is herein incorporated by reference as well. Other examples of voice-recognition applications include Voice extensible markup language (VXML) compliant products. In this embodiment, the initiator may pre-program contact information including a participant's name and device address, and associate the device address with a participant's name. When initiating the teleconference, the initiator may speak the name of a participant and the teleconference server 52 will identify the participant's contact information using the voice-recognition unit 69. If the participant's device address has not been pre-programmed, the initiator may speak the participant's address, and the teleconference server 52 will identify the participant's device address using the voice-recognition unit 69. Examples of commands that may be implemented by DTMF recognition and/or voice-recognition include, but are not limited to, dialing, web browsing, calling, bringing up a contact list, adding a contact, removing a contact, stopping a call, entering additional participant addresses, putting one or more participants on hold during a teleconference, adding or removing participants during a teleconference.

In one embodiment, the teleconference server 52 implements presence management to analyze whether an invited participant is present with a participant communication device. Depending on the nature of the participant's presence, a participant device may be excluded from receiving a prompt. In one embodiment, presence management may determine if the participant is present at the participant device, and if the participant is not present, the participant device is excluded from being sent a prompt. For example, if the participant device is a computer, and presence management detects that the participant computer is not on, or the participant has not touched her keyboard for a period of time, then the participant is determined to not be present, and the computer will be excluded as a participant device. In another embodiment, the nature of the presence of the participant may be evaluated. For example, if the participant device is a cellular phone, and presence management detects that the cellular phone is moving, then it will be determined that the participant is present with the cellular phone as she is the one causing the cellular phone to move. However, the cellular phone may be excluded as a participant device, if for example, the participant prefers that she not be contacted by cellular phone while she is traveling. Example of presence management products include the Oz Instant Messaging and Presence Services Server, and the Oz Instant Messaging and Presence Services J2ME Client produced by OZ Communications, Inc. of Montreal, Canada, presence solution products including Odigo Express and Odigo Messenger produced by Odigo Inc. and dynamicsoft Presence Engine produced by dynamicsoft Inc. of Parsippany, N.J. and each of these products is herein incorporated by reference.

The teleconference server may be a remote server that communicates with, or is integral with, a PSTN central office or a cellular network mobile switching center (MSC). The teleconference server may have a short message service centers (SMSC) gateway server and/or a short message peer to peer (SMPP) gateway server.

Figure 6:
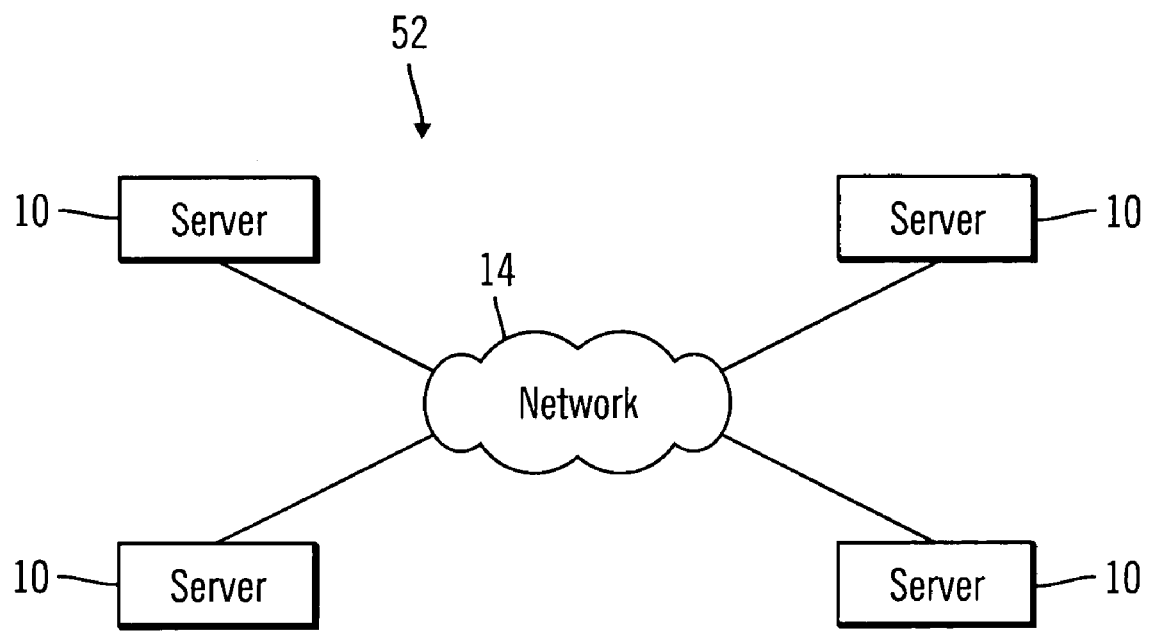
FIG. 6 is a schematic representation of one embodiment of a computer network through which teleconference server of the present invention may be implemented.

Referring to FIG. 6, in one embodiment, the teleconference server 52 comprises several servers 10 that are interconnected via a communication network 14, such as a landline telephone network or an IP network, with each server 10 having the full functionality of a teleconference server as described above, however each serving a different geographical region, for example. Details of various hardware and software components comprising the communication network 14 are not shown (such as servers, routers, gateways, etc.) as they are well known in the art. Further, it is understood that access to the communication network 14 by the servers 10 may be via suitable transmission medium, such as coaxial cable, telephone wire, wireless RF links, or the like. Communication between the servers 10 takes place by means of an established protocol. Depending on the participant's device location, the teleconference server 52 may provide a unique access address in the teleconference notification to the recipient/participant, which is directed to participate in the conference call by accessing a server 10 located in the same region as the participant's device. For example, an initiator can initiate a conference call with notification of a participant in another country. The teleconference server 52 would determine the country based on the participant address specified by the initiator, and route the teleconference notification message to a local server 10 that serves that country to be sent to the participant, and/or the access point to the conference call to the local server 10. Upon notification, the participant could simply join the conference call at the prescribed time via that server 10 that is located in his local region, instead of making a long distant call to a server located in another country or region. The notification message may be routed to the local server in another country via an IP network, telephony network including a cellular, a broadband network, etc.

In an alternate embodiment, an initiator may establish a teleconference using a web interface such as a web browser. Using the web interface the initiator may select participants for the teleconference. The selected participants are communicated to the teleconference server, which then sends a prompt or notification to the intended participants to join the teleconference. The teleconference may be monitored by a participant using the web interface including the status of which participant has joined the conference call.

Figure 7:
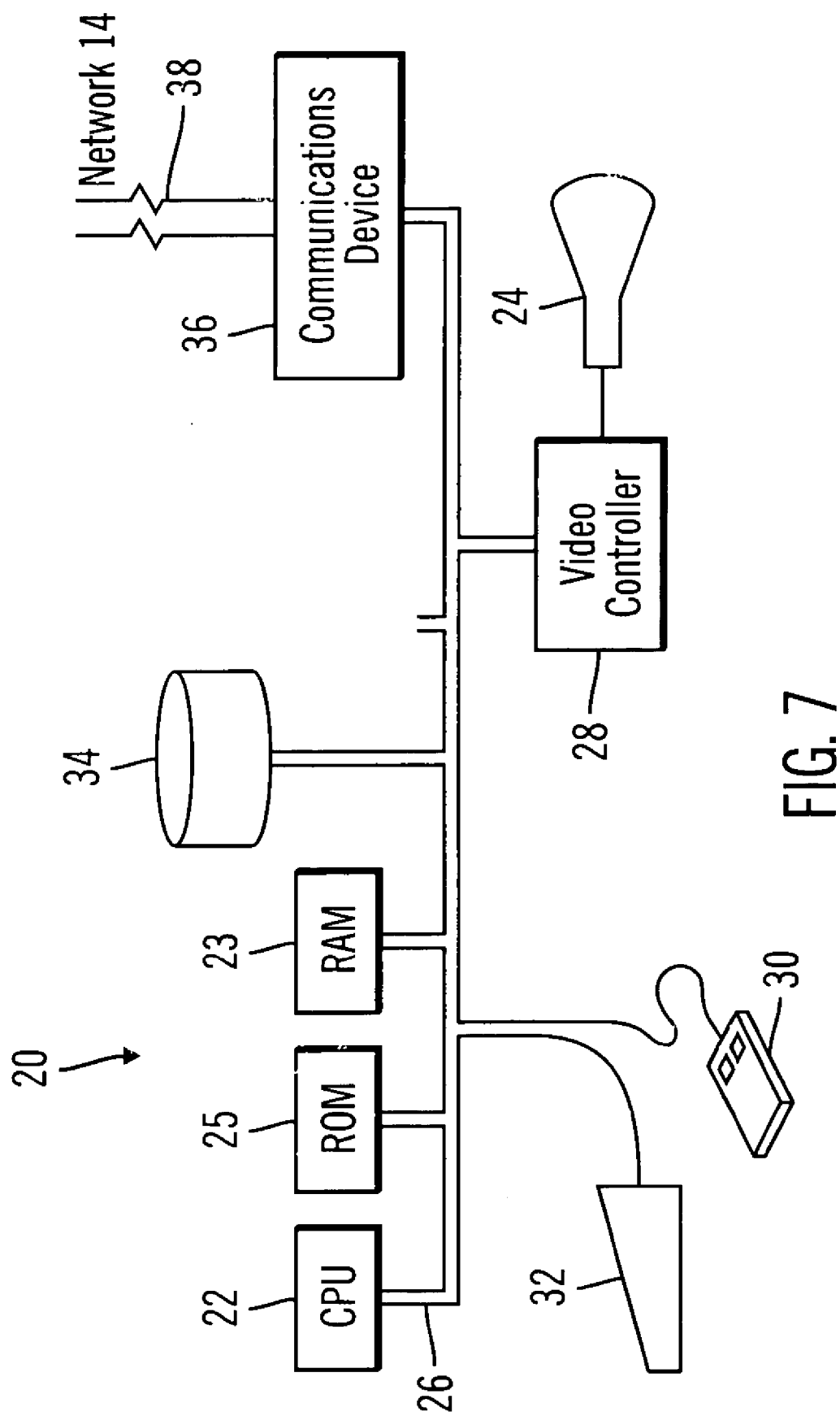
FIG. 7 is a schematic representation of one embodiment of a computer system through which teleconference server of the present invention may be implemented.

Turning now to FIG. 7, there is schematically illustrated one embodiment of a computer system 20 which may be configured as the teleconference server 52. The computer system 20 communicates with the network 14 as well as cellular networks and PSTN's. The computer system 20 includes a processor 22, internal random-access memory ("RAM") 23 and read-only memory ("ROM") 25, and data bus architecture 26 for coupling the processor 22 to various internal and external components. The computer system 20 further includes a communication device 36 which, in turn, is coupled to a communication channel 38 for effecting communication with the network 14. A mass storage device 34, such as a hard disk drive or floppy disk drive or CD-ROM drive, is coupled to the processor 22 for storing utility and application software (including a suitable web browser for navigating the Internet network) and other data. The application software is executed or performed by the processor 22.

The teleconference server 52 herein described may be coupled to, without limitation, distributed information exchange networks, such as PSTN, cellular network, public and private computer networks (e.g., Internet, Intranet, WAN, LAN, etc.), value-added networks, communications networks (e.g., wired or wireless networks), broadcast networks, and a homogeneous or heterogeneous combination of such networks. The teleconference notification message to the participant may be sent via one or a combination of such networks. The participant may join in the teleconference via one or a combination of such networks. As will be appreciated by those skilled in the art, the networks may include both hardware and software and can be viewed as either, or both, according to which description is most helpful for a particular purpose. For example, the teleconference server 52 can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such mediums and communications facility involve both software and hardware aspects.

Cross-reference is made to copending U.S. patent application Ser. No. 10/852,849, entitled "A Method And System For Selecting A Communication Channel With A Recipient Device Over a Communication Network", which is concurrently filed on May 24, 2004, and commonly assigned to the assignee of the present invention. This copending application is fully incorporated by reference herein, as if fully set forth herein. The invention disclosed in that application may be used to select the teleconference notification messaging feature of the present invention as the most appropriate mode or channel of communication when establishing a teleconference.

A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or computing devices, which devices may be standalone devices or part of a larger system. The devices may be selectively activated or reconfigured by a program, routine and/or a sequence of instructions and/or logic stored in the devices. For example, the teleconference server 52 may be implemented as a unitary physical device, or a combination of several separate discrete physical devices operationally coupled together to form a functional teleconference server, each with one or more dedicated functions. In short, use of the methods described and suggested herein is not limited to a particular processing configuration.

It is appreciated that detailed discussion of the actual implementation of the teleconference server is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

Address Book

The initiator has access to an address book stored on the teleconference server 52 or on an initiator device. In one embodiment, a global address book lists the names and contact information of all subscribers to the teleconference server. The contact information can include, but is not limited to, phone numbers and electronic mail addresses. An initiator may also choose to create his own personal address book that lists only the contact information of people the initiator has placed in the address book. Often an initiator may teleconference with a new participant who is not listed in an address book. When the initiator invites a new participant to teleconference, the teleconference server detects whether the contact information of the new participant is contained within an address book. If the new participant's contact information is not present in an address book, the teleconference server prompts the initiator to add the new participant's contact information.

An initiator may also group participants into a distribution list where the initiator need only select the distribution list as the participant to send a prompt to each member of the distribution list. Each member of the list may have different types of participant devices. Also, a distribution list may be created that sends a prompt to multiple devices of a single participant.

In embodiment the present invention, the teleconference server communicates with an initiator device, and downloads the contact information of participants stored in the initiator device. The contact information is then placed within an address book. For example, a cellular phone may have a SIM card that functions as a memory device for storing contact information. The sim card allows the user of the cellular phone to add and delete contact information. The teleconference server may download the contact information contained in the SIM card. In this embodiment of the invention, a user of the cellular phone may make changes to the contact information on the SIM card, and these changes would be reflected on the address book contained at the teleconference server or vice versa. To keep the contact information of the initiator updated, the teleconference server may periodically query the cellular phone or the cellular phone may transmit changes in its SIM card to the teleconference server each time changes are made to the stored contact information.

Accordingly, it is to be understood that the invention is not to be limited by the specific illustrated embodiments, but only by the scope of the appended claims.

The invention claimed is:

1. A method for an initiator to establish a teleconference and sending a notification to a plurality of participants comprising the steps:

said initiator contacting the teleconference server to establish the teleconference with the plurality of participants;

said teleconference server performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

said teleconference server associating said teleconference with a unique access address and associating said unique access address with a notification message;

performing presence management to determine if said participant is present with a particular participant device, wherein the teleconference server sends the notification message to the plurality of participant devices when said presence management determines that said participant's devices are present with the respective participants;

said plurality of participants accessing said unique access address to participate in said teleconference, wherein the unique access number used by each participant for participating in the conference is the unique access address of said teleconference;

said teleconference server identifying the unique access address used by each participant; and said teleconference server routing each participant to the teleconference corresponding to the unique access address identified.

2. The method of claim 1, wherein said unique access address comprises at least one of a phone number and a web address.

3. The method of claim 1, wherein said notification message is sent within at least one of a text message, a voice message and an electronic mail when said participant device is present with said participant, wherein the presence of the participant device with the participant is determined by presence management.

4. The method of claim 1, wherein at least one of the participants access the unique access address using a different device used to receive the notification message.

5. The method of claim 1 wherein the initiator contacts the teleconference server over a communication network subscribed by the initiator, and the teleconference server sends the notification message to the plurality of participants over at least one different network subscribed by at least one of the participants.

6. The method of claim 1 wherein more than one teleconference are established by the teleconference server, and wherein a different unique access address is associated with a different teleconference.

7. The method of claim 1 wherein said step of said teleconference server identifying the unique access address comprises the steps of:

teleconference server determining a dialed access phone number with a dialed number identification service (DNIS); and teleconference server determining a teleconference associated with said dialed access phone number.

8. The method of claim 7 wherein said step of said plurality of participants accessing said unique access address comprises the steps of authenticating each participant.

9. The method of claim 1 further comprising the steps of the initiator designating a device address for each participant to which the notification message, and the step of authenticating each participant includes the step of determining the respective participant's device address.

10. The method of claim 1 wherein the initiator has an initiator cellular device and at least one of the participants has a participant cellular device, and wherein the initiator contacts said teleconference server using the initiator cellular device, and said at least one of the participants accesses the unique access address to participate in the teleconference using the participant cellular device.

11. The method of claim 10, wherein the notification message is sent via text messaging to the participant cellular device.

12. A system for establishing a teleconference requested by an initiator with respect to between a plurality of participants, comprising:

a teleconference server;

a communication network for teleconferencing initiated by said initiator with respect to said plurality of participants;

said teleconference server receiving the initiator request and associating said teleconference with a unique access address, and associating said unique access address with a notification message wherein the unique access address used by each participant to participate in the conference is the unique access address of said teleconference;

said teleconference server determining if said participant is present with a particular participant device, wherein the presence of the participant with the participant device is determined by presence management and sending the notification message to the plurality of those participants devices when the participant's devices are present with the respective participants;

said teleconference server performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

said teleconference server providing access by the plurality of participants using said unique access address to participate in said teleconference, said teleconference server identifying the unique access address used by each participant; and said teleconference server routing each participant to the teleconference corresponding to the unique access address identified.

13. The system of claim 12, wherein said network comprises at least one of a cellular network, a wide area network, a telephony network, an IP network and a data network.

14. A computer readable medium for encoding a computer program to establish a teleconference requested by an initiator with respect to a plurality of participants, comprising:

a first program module for receiving said request for the teleconference from the initiator;

a second program module for associating said teleconference with a unique access address, and associating said unique access address with a notification message;

a third program module for determining if said participant is present with a particular participant device, wherein the presence of the participant with the participant device is determined by presence management and sending the notification message to the plurality of participants, when said participant is present with a particular participant device;

a fourth program module performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

a fifth program module for sending the said notification message to the said plurality of participants;

a sixth program module for providing access to said the plurality of participants using said unique access address to participate in said teleconference wherein the unique access address used by each participant for participating in the conference is the unique access address of said teleconference;

a seventh program module for identifying the unique access address used by each participant; and an eighth program module routing each participant to the teleconference corresponding to the unique address identified.

15. A method for an initiator to establish a teleconference and sending notification to a plurality of participants comprising the steps:

said initiator contacting the teleconference server to establish the teleconference with the plurality of participants;

said teleconference server performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

said teleconference server associating said teleconference with a different unique access address for each participant and associating each said unique access address with a notification message, wherein different unique access addresses are assigned for different participants of the same teleconference;

performing presence management to determine if said participant is present with a particular participant device wherein the teleconference server sends the notification message to the plurality of participant devices when said presence management determines that said participant's devices are present with the respective participants;

said plurality of participants accessing said unique access address to participate in said teleconference;

said teleconference server identifying the unique access address used by each participant; and said teleconference server routing each participant to the teleconference corresponding to the unique access address identified.

16. A system for establishing a teleconference requested by an initiator with respect to between a plurality of participants, comprising:

a teleconference server receiving the initiator request and associating said teleconference with a different unique access address for each participant and associating each said unique access address with a notification message, wherein different unique access addresses are assigned for different participants of the same teleconference;

said teleconference server determining if said participant is present with a particular participant device, wherein the presence of the participant with the participant device is determined by presence management and sending the notification message to the plurality of those participants devices when the participant's devices are present with the respective participants;

said teleconference server performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

said teleconference server providing access by said plurality of participants using the participant's unique access address to participate in said teleconference, said teleconference server identifying the unique access address used by each participant; and said teleconference server routing each participant to the teleconference corresponding to the unique access address identified.

17. A computer readable medium for encoding a computer program to establish a teleconference requested by an initiator with respect to a plurality of participants, comprising of:

a first program module for receiving said request for the teleconference from the initiator;

a second program module for associating said teleconference with a different unique access address for each participant and associating each said unique access address with a notification message, wherein different unique access addresses are assigned for different participants of the same teleconference;

a third program module for determining if said participant is present with a particular participant device, wherein the presence of the participant with the participant device is determined by presence management and sending the notification message to the plurality of participants, when said participant is present with a particular participant device;

a fourth program module performing mode conversion at notification, wherein text is converted to voice when the mode of input by the initiator is text and the mode of reception at the participant's device is voice, and wherein voice is converted to text when the mode of input at the initiator's device is voice and the mode of reception at the participant's device is text;

a fifth program module for sending said notification message to the plurality of participants;

a sixth program module for providing access to the plurality of participants using their unique access addresses to participate in said teleconference;

a seventh program module identifying the unique access address used by each participant; and an eighth program module routing each participants to the teleconference corresponding to the unique address identified.

18. The method of claim 1, wherein said notification message contains a unique access phone number associated with said teleconference, said unique access phone number is not visible to the participant, but is associated with a menu prompt, and wherein the unique access phone number is dialed on selection of a specified button on said menu prompt.

19. The method of claim 1, wherein participants communicate with the server via a plurality of modes of input, including text inputs, voice commands, dual tone multi frequency inputs via a phone handset, and web based interface.

20. The method of claim 1, wherein the teleconference initiator provides notification redundancy by sending notifications to a plurality of devices of an intended participant, if the intended participant has a plurality of devices.

21. The method of claim 1, wherein once the participant joins the teleconference, or after the teleconference has concluded, a cancellation message is sent to all the participant devices that earlier received the notification message, in order to avoid the inconvenience of attempting to access a teleconference that has already concluded.

22. The method of claim 5, wherein said initiator may speak the name of a participant and the teleconference server identifies the participant's contact information using a voice recognition unit.

23. The method of claim 12, wherein the teleconference may be established using a web interface, and the interface is used to send notification messages to the participants.

24. The method of claim 12, wherein the notification message sent to participants is a voice message, and wherein a voice menu is offered to said participant on receiving said voice notification and a voice response or dual tone multi frequency responses can be used to interact with the voice menu.

25. The method of claim 12, wherein said teleconference server comprises of a plurality of servers interconnected via a communication network for participants to access the teleconference globally and wherein a participant residing in another country receiver a notification message from the initiator, and said participant can join the teleconference at the prescribed time via a locally located server.

* * * * *